UNITED STATES PATENT OFFICE.

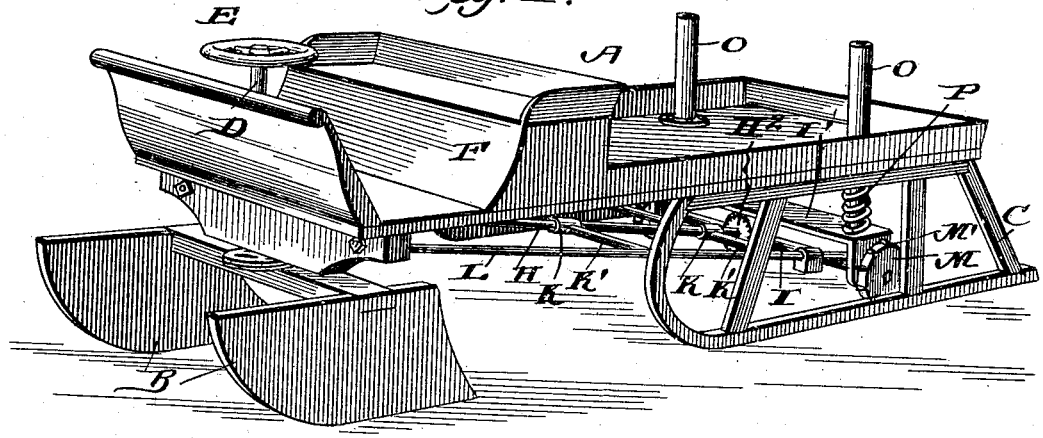
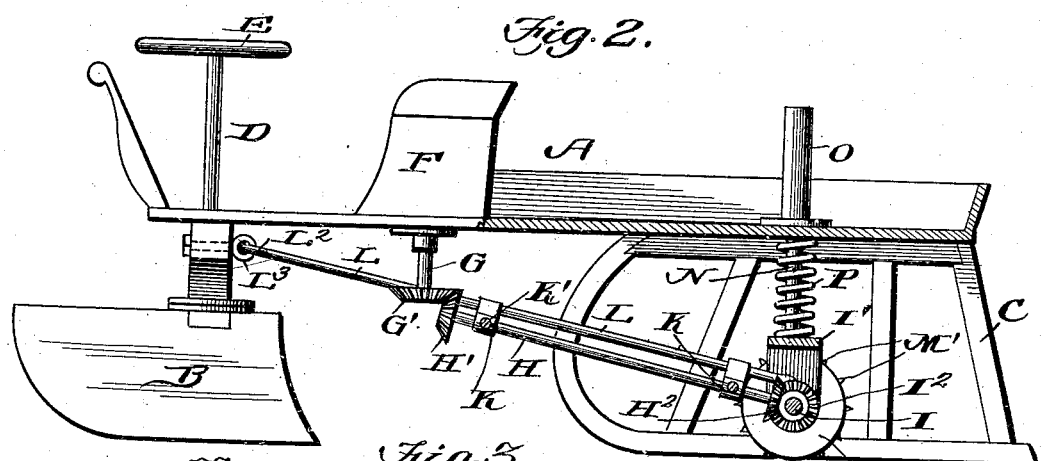
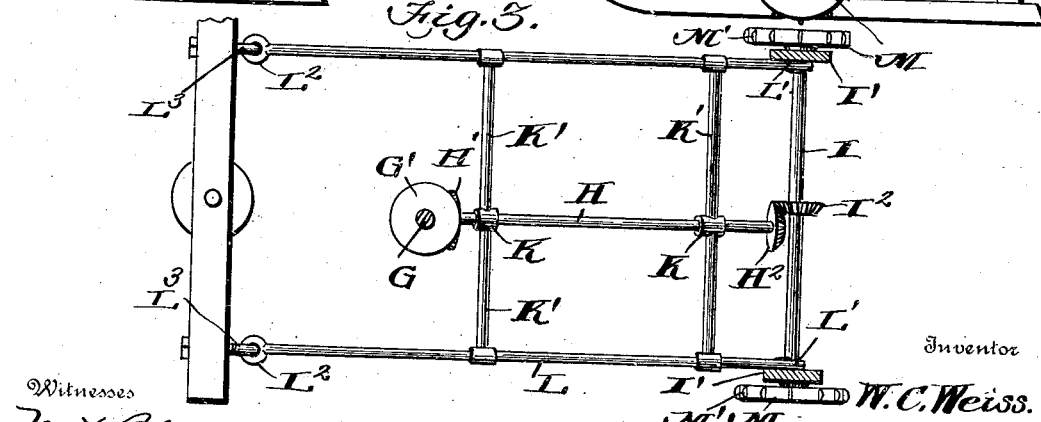

WILLIAM C. WEISS, OF MILWAUKEE, WISCONSIN.

AUTOMOBILE SLEIGH.

No. 874,467.  Specification of Letters Patent.  Patented Dec. 24, 1907.

Application filed December 31, 1903. Serial No. 187,329.

*To all whom it may concern:*

Be it known that I, WILLIAM C. WEISS, a citizen of the United States, residing at Milwaukee, in the county of Milwaukee and State of Wisconsin, have invented a new and useful Automobile Sleigh, of which the following is a specification.

This invention relates generally to sleighs and more particularly to an improved means for propelling the same, the object being to provide an automobile sleigh which can be operated by steam, electricity, vapor, or any suitable form of propelling mechanism.

Another object of the invention is to provide a device of such construction that the propelling wheels proper will always remain in contact with the surface no matter whether said surface be regular or irregular, even or uneven.

With these objects in view the invention consists in the novel features of construction hereinafter fully described and pointed out in the claims.

In the drawings forming part of this specification: Figure 1 is a perspective view of an automobile sleigh constructed in accordance with my invention. Fig. 2 is a sectional elevation. Fig. 3 is a top plan view of a portion of the movable frame carrying the propelling wheels.

In carrying out my invention I employ a main frame or body portion A, which is supported at the forward end upon the front runners B, which are adapted to turn, and at the rear end by means of the stationary runners C. The front runners are turned by means of the steering post D, having a steering wheel E, at the upper end thereof. The seat box F, is of such size and shape that the motor can be arranged therein, said motor driving a depending shaft G, which carries a bevel gear G', upon its lower end, said bevel gear meshing with the bevel gear H', carried by a shaft H, said shaft carrying the bevel gear H², at its lower end which meshes with a bevel gear I², mounted upon an axle I, said axle being attached to a beam I'.

The shaft H, works in sleeves K, supported by rods K', attached to side bars L, said side bars being rigidly connected at their lower ends L', to the beam I', and at their upper ends are provided with eyes L², which connect with eye-bolts L³, carried by the forward end of the frame. This construction permits the side bars to have a limited swinging movement and mounted upon the ends of the axle I, are propelling wheels M, the peripheries of which are provided with suitable spurs M', for the purpose of engaging the ice or snow. The shaft H, being fixed between the bevel gears G', and I², the gears H' and H², will always remain in contact with the said gears and the swinging motion of the frame will not interfere with this engagement of the gears as the said shaft H, works freely in the collars K. For the purpose of holding the wheels M, in contact with the snow or ice during all variations of the surface I employ the rods N, which are connected to the beam I', and extend upwardly through the body of the sleigh and work in the sleeves or tubes O, attached to said body and surrounding these rods between the beam of the sleigh and the top of the beam are the spiral springs P, the purpose of which is to hold the spike wheels in contact with the ice and snow. An automobile sleigh constructed as herein shown and described is simple and efficient in operation and will carry out all of the objects hereinbefore mentioned.

Having thus fully described my invention what I claim as new and desire to secure by Letters Patent is:—

The combination with a sleigh body mounted on runners, of spaced rods mounted in said body carrying a beam with downwardly projecting ends, springs surrounding said rods between said beam and body, an axle mounted in the downwardly projecting ends of the beam provided with spur wheels at its ends, side bars connecting said axle to said body provided with cross bars, a shaft mounted on said cross bars provided with a bevel gear at each end, a bevel gear carried by the axle meshing with one of the gears of the shaft and a drive shaft provided with a bevel gear meshing with the bevel gear at the other end of the shaft, for the purpose described.

WM. C. WEISS.

Witnesses:
J. D. SMOKE,
JOSEPH G. MARKS.